United States Patent
Liao et al.

(10) Patent No.: US 8,884,537 B2
(45) Date of Patent: Nov. 11, 2014

(54) ACTIVE BLEEDER CIRCUIT TRIGGERING TRIAC IN ALL PHASE AND LIGHT EMITTING DEVICE POWER SUPPLY CIRCUIT AND TRIAC CONTROL METHOD USING THE ACTIVE BLEEDER CIRCUIT

(71) Applicants: Chia-Wei Liao, Zhubei (TW); Leng-Nien Hsiu, Zhubei (TW); Pei-Yuan Chen, Taoyuan (TW); Roland Van Roy, Eindhoven (NL); Jing-Meng Liu, Zhubei (TW)

(72) Inventors: Chia-Wei Liao, Zhubei (TW); Leng-Nien Hsiu, Zhubei (TW); Pei-Yuan Chen, Taoyuan (TW); Roland Van Roy, Eindhoven (NL); Jing-Meng Liu, Zhubei (TW)

(73) Assignee: Richtek Technology Corporation, Chupei, Hsin-Chu (TW)

( * ) Notice: Subject to any disclaimer, the term of this patent is extended or adjusted under 35 U.S.C. 154(b) by 49 days.

(21) Appl. No.: 13/728,541

(22) Filed: Dec. 27, 2012

(65) Prior Publication Data
US 2013/0169177 A1 Jul. 4, 2013

Related U.S. Application Data

(60) Provisional application No. 61/581,712, filed on Dec. 30, 2011.

(51) Int. Cl.
| | |
|---|---|
| *H05B 37/02* | (2006.01) |
| *H05B 39/02* | (2006.01) |
| *H05B 39/04* | (2006.01) |
| *H05B 41/36* | (2006.01) |
| *G05F 3/02* | (2006.01) |
| *G05F 1/455* | (2006.01) |
| *H05B 33/08* | (2006.01) |
| *G05F 1/10* | (2006.01) |

(52) U.S. Cl.
CPC ............... *G05F 1/455* (2013.01); *H05B 37/02* (2013.01); *G05F 3/02* (2013.01); *Y02B 20/346* (2013.01); *H05B 33/0815* (2013.01); *G05F 1/10* (2013.01)
USPC ........................................ 315/200 R; 315/179

(58) Field of Classification Search
CPC .... H05B 41/34; H05B 33/0803; H05B 39/09; H05B 41/46; H05B 41/044; H05B 6/666; H05B 41/18
USPC ......... 315/200 R, 36, 46, 101, 171, 179, 189, 315/324, 352
See application file for complete search history.

(56) References Cited

U.S. PATENT DOCUMENTS

| | | | | |
|---|---|---|---|---|
| 8,593,129 | B2 * | 11/2013 | Gaknoki et al. | 323/300 |
| 2012/0299572 | A1 * | 11/2012 | Eom et al. | 323/312 |
| 2013/0154515 | A1 * | 6/2013 | Brandt | 315/307 |
| 2013/0278159 | A1 * | 10/2013 | Del Carmen et al. | 315/200 R |
| 2013/0300303 | A1 * | 11/2013 | Liu | 315/200 R |

* cited by examiner

*Primary Examiner* — Dylan White
(74) *Attorney, Agent, or Firm* — Tung & Associates

(57) ABSTRACT

The present invention discloses an active bleeder circuit capable of triggering a tri-electrode AC switch (TRIAC) circuit in all phase. The active bleeder circuit receives a rectified signal having an OFF phase and an ON phase. The active bleeder includes: a detection circuit for generating a detection signal according to the rectified signal and accumulating the detection signal in the OFF phase of the rectified signal; and a current sinker circuit coupled to the detection circuit, for generates a latching current to trigger the TRIAC circuit by operating a switch when the detection signal exceeds a predetermined level. The present invention also discloses a light emitting device power supply circuit and a TRIAC control method using the active bleeder circuit.

12 Claims, 8 Drawing Sheets

ACTIVE BLEEDER CIRCUIT TRIGGERING TRIAC IN ALL PHASE AND LIGHT EMITTING DEVICE POWER SUPPLY CIRCUIT AND TRIAC CONTROL METHOD USING THE ACTIVE BLEEDER CIRCUIT

CROSS REFERENCE

The present invention claims priority to U.S. 61/581,712, filed on Dec. 30, 2011.

BACKGROUND OF THE INVENTION

1. Field of Invention

The present invention relates to an active bleeder circuit capable of triggering a tri-electrode AC switch (TRIAC) in all phase, and a light emitting device power supply circuit and a TRIAC control method using the active bleeder circuit. Particularly, it relates to an active bleeder circuit which is capable of triggering a TRIAC circuit in all phase, but does not consume power when a TRIAC circuit is not provided, and a light emitting device power supply circuit and a TRIAC control method using the active bleeder circuit.

2. Description of Related Art

FIG. 1A shows a schematic diagram of a prior art light emitting diode (LED) power supply circuit 100. As shown in FIG. 1A, the LED power supply circuit 100 includes a tri-electrode AC switch (TRIAC) dimmer circuit 12, a rectifier circuit 14, and an LED driver circuit 16. The TRIAC dimmer circuit 12 receives an AC input signal at an AC input node VL, and generates a phase-cut AC dimming signal at an phase-cut AC dimming node VL'. When the AC input signal exceeds a trigger phase, a TRIAC device in the TRIAC dimmer circuit 12 is triggered to turn ON. FIG. 1B shows the waveform of the AC input signal VL (dashed line) received by the TRIAC dimmer circuit 12 and the waveform of the phase-cut AC dimming signal VL' (solid line) generated by the TRIAC dimmer circuit 12. The rectifier circuit 14 receives the phase-cut AC dimming signal VL' and a neutral signal at a neutral node VN, and rectifies the voltage difference between them, to generate a rectified dimming signal at a rectified node VD. The rectified dimming signal VD is inputted to the LED driver circuit 16 to drive an LED circuit 11. In the above circuit, the TRIAC dimmer circuit 12 is provided for adjusting an average brightness of the LED circuit 11 by tuning the trigger phase of the phase-cut AC dimming signal VL'.

One drawback of the aforementioned prior art is that the TRIAC dimmer circuit 12 includes a TRIAC device which needs a relatively high latching current to trigger. If the load circuit driven by the power supply circuit 100 is a circuit consuming high power such as an incandescent bulb, the high latching current is naturally generated and therefore is not a considerable issue. However, when the power supply circuit 100 is driving a light load circuit such as the LED circuit which consumes low power, the high latching current requirement becomes a considerable issue. If the latching current is not high enough to trigger the TRIAC device, the TRIAC device misfires and the LED circuit 11 flickers. FIG. 1C shows the waveform of the phase-cut AC dimming signal VL' when the TRIAC misfires, which causes the LED circuit 11 to flicker.

FIGS. 2A and 2B show schematic diagrams of another prior art LED power supply circuit 110, which is proposed to mitigate the aforementioned LED flicker issue. As shown in FIG. 2A, the prior art LED power supply circuit 110 includes a bleeder circuit 18 in additional to the TRIAC dimmer circuit 12, the rectifier circuit 14, and the LED driver circuit 16. The bleeder circuit 18 is coupled between the rectifier circuit 14 and the LED driver circuit 16, for generating a sufficient latching current periodically to trigger the TRIAC device in the TRIAC dimmer circuit 12. After the TRIAC device is triggered, the latching current generated by the bleeder circuit 18 is consumed by a loop connected to ground. FIG. 2B shows a specific embodiment of the LED power supply circuit 110 including the bleeder circuit 18.

More specifically, the bleeder circuit 18 includes resistors R1 and R2, which are connected in series between two output nodes of the rectifier circuit 14. A divided voltage across the resistor R2 turns ON a switch Q1, which generates the latching current for the TRIAC device. A resistor R3 and Zener diodes ZD1 and ZD2 are connected in series; after the switch Q1 is turned ON, a divided voltage at the node between the resistor R3 and the Zener diode ZD1 turns ON the switch Q2, such that a holding current is generated and flows through a resistor R4. The waveforms of the AC input signal VL, the phase-cut AC dimming signal VL', and a TRIAC current IT are shown in FIG. 2C.

Even though the prior art LED power supply circuit 110 shown in FIGS. 2A and 2B mitigates the LED flicker issue caused by the misfire of the TRIAC device, this prior art has a drawback that the TRIAC device in the TRIAC dimmer circuit 12 can not be triggered in all phase. More specifically, for the bleeder circuit 18 to generate the latching current to trigger the TRIAC device, the rectified dimming signal generated by the rectifier circuit 14 at the rectified node VD must be higher than a certain level such that the divided voltage across the resistor R2 is higher than the threshold voltage of the switch Q1. If a user intends to turn low the brightness of the LED circuit 11 to an extent that the rectified dimming signal is too low, i.e., if the ON phase of the rectified dimming signal in FIG. 1B or 2C is too short such that the trigger phase is too close to the end of the period of the phase-cut AC dimming signal (referring to FIG. 4A), the divided voltage across the resistor R2 will be lower than the threshold voltage of the switch Q1, and the TRIAC device can not be triggered because no latching current is generated. In other words, in this prior art which uses the bleeder circuit 18, a user can not use the TRIAC dimmer circuit 12 to adjust the brightness of the LED circuit 11 in full range (the TRIAC device in the TRIAC dimmer circuit 12 can not be triggered in all phase), and there is a limit to the latest timing of the trigger phase. Furthermore, in certain applications it is not necessary to provide the dimming function and therefore the TRIAC dimmer circuit 12 is not required, but in this prior art, even though there is no TRIAC dimmer circuit 12, the bleeder circuit 18 still generates current and consumes power which is completely wasted.

In view of the foregoing, the present invention provides an active bleeder circuit, and a light emitting device power supply circuit and a TRIAC control method using the active bleeder circuit, wherein the active bleeder circuit is capable of triggering a TRIAC circuit in all phase, but does not consume power when a TRIAC circuit is not provided.

SUMMARY OF THE INVENTION

A first objective of the present invention is to provide a light emitting device power supply circuit.

A second objective of the present invention is to provide an active bleeder circuit.

A third objective of the present invention is to provide a TRIAC control method.

To achieve one or more of the above and other objectives, from one perspective, the present invention provides a light emitting device power supply circuit, including: a TRIAC dimmer circuit, for generating a phase-cut AC dimming signal, wherein the phase-cut AC dimming signal has an OFF phase and an ON phase; a rectifier circuit, which is coupled to the TRIAC dimmer circuit, for generating a rectified dimming signal according to the phase-cut AC dimming signal, wherein the rectified dimming signal has an OFF phase and an ON phase corresponding to the OFF phase and the ON phase of the phase-cut AC dimming signal; a light emitting device driver circuit, for driving a light emitting circuit according to the rectified dimming signal; and an active bleeder circuit, including: a detection circuit, which is coupled to the rectifier circuit, for generating a detection signal and accumulating the detection signal in the OFF phase; and a current sinker circuit, which is coupled to the detection circuit, for generating a latching current to trigger the TRIAC dimmer circuit by operating a switch therein when the detection signal exceeds a predetermined level.

From another perspective, the present invention provides an active bleeder circuit, including: a detection circuit, coupled to a rectified signal having an OFF phase and an ON phase, for generating a detection signal according to the rectified signal and accumulating the detection signal in the OFF phase of the rectified signal; and a current sinker circuit, which is coupled to the detection circuit, for generating a latching current by operating a switch therein when the accumulated detection signal exceeds a predetermined level.

In one preferable embodiment, the current sinker circuit turns OFF the switch therein to stop generating the latching current in the ON phase.

In one preferable embodiment, the detection circuit includes: a conversion device, for converting the rectified signal to the detection signal; and a storage device, for storing and accumulating the detection signal.

In one preferable embodiment, the detection circuit further includes an OFF control circuit, for turning OFF the switch of the current sinker circuit in the ON phase. The OFF control circuit preferably includes a Zener diode, which has a reverse end coupled to the detection signal, and a forward end coupled to a relatively lower level, such that when a voltage difference between the detection signal and the relatively lower level exceeds a reverse breakdown voltage of the Zener diode, the Zener diode turns ON reversely.

In one preferable embodiment, the detection circuit further includes a reset circuit, for resetting the detection signal. The reset circuit preferably includes a diode, which has a forward end coupled to the storage device, and a reverse end for receiving a reset signal to reset the detection signal.

From another perspective, the present invention provides a TRIAC control method, including: receiving a rectified signal having an OFF phase and an ON phase, wherein the rectified signal is generated by rectifying a phase-cut AC signal generated by a TRIAC circuit; generating a detection signal according to the rectified signal and accumulating the detection signal in the OFF phase; and when the accumulated detection signal exceeds a predetermined level, generating a latching current to trigger the TRIAC circuit.

In one preferable embodiment, the TRIAC control method further includes: stopping generating the latching current in the ON phase.

In one preferable embodiment, the step of generating and accumulating the detection signal includes: charging a capacitor by a current according to the rectified signal in the OFF phase.

In one preferably embodiment, the TRIAC control method of further includes: discharging the capacitor in the ON phase.

In one preferable embodiment, the step of generating and accumulating the detection signal further includes: resetting the detection signal periodically.

The objectives, technical details, features, and effects of the present invention will be better understood with regard to the detailed description of the embodiments below.

DESCRIPTION OF THE PREFERRED EMBODIMENTS

Figure 3:
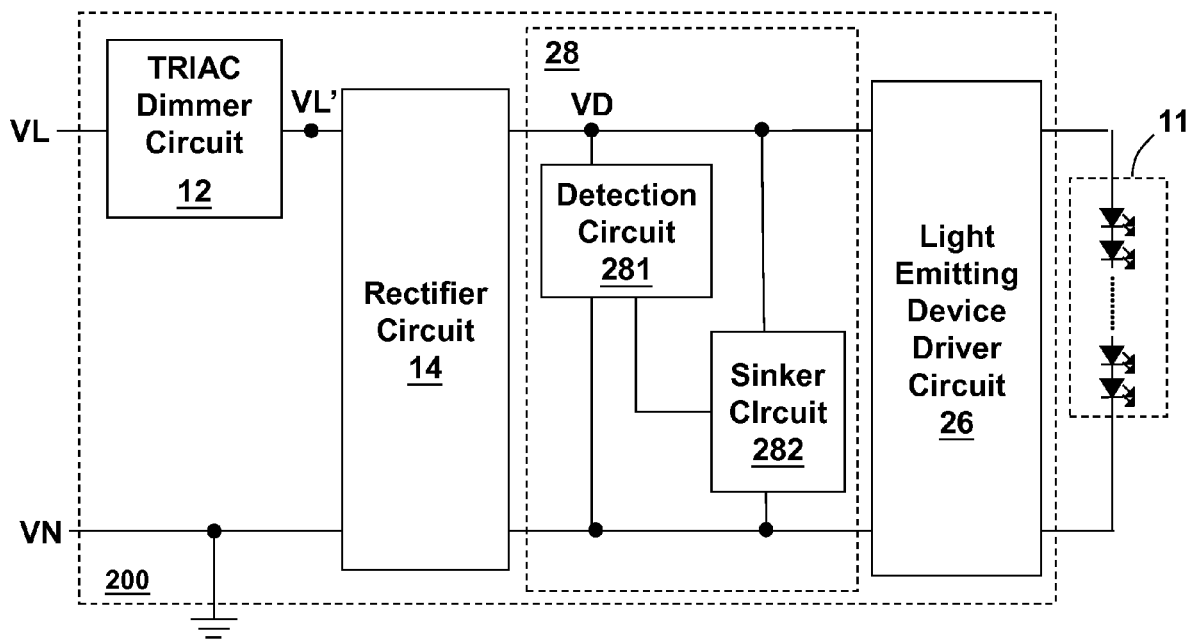
FIG. 3 shows a first embodiment of the present invention.
Figure 4A:
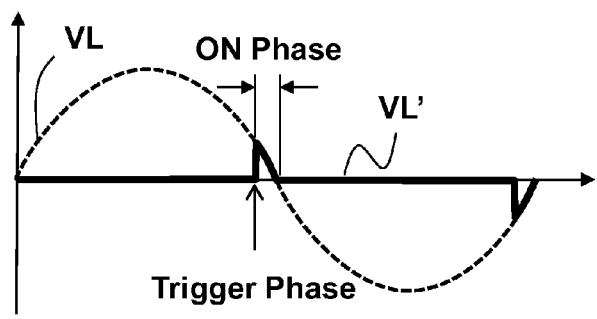
FIG. 4A shows waveforms of the signals inputted to and outputted from the TRIAC dimmer circuit.
Figure 4B:
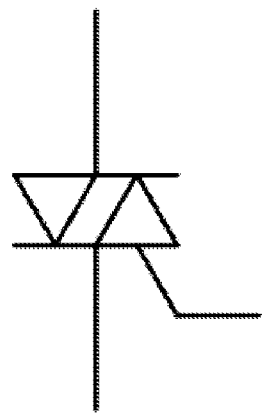
FIG. 4B shows a TRIAC device formed by SCR devices.

FIG. 3 shows a first embodiment of the present invention. As shown in FIG. 3, a light emitting device power supply circuit 200 includes a tri-electrode AC switch (TRIAC) dimmer circuit 12, a rectifier circuit 14, an active bleeder circuit 28, and a light emitting device driver circuit 26. The TRIAC dimmer circuit 12 receives an AC signal VL having a waveform shown by a dashed line in FIG. 4A. When the AC signal exceeds a trigger phase, the TRIAC dimmer circuit 12 is triggered to turn ON, and generates a phase-cut AC dimming signal VL'. The phase-cut AC dimming signal VL' has a waveform shown by a solid line in FIG. 4A. The TRIAC dimmer circuit 12 includes a TRIAC device, which for example includes two silicon control rectifiers (SCR) connected together, as shown in FIG. 4B. The TRIAC device and the SCR are well known by those skilled in the art, so details thereof are omitted here. The TRIAC device needs a relatively high latching current to trigger, and needs a holding current to maintain operation which is relatively lower than the latching current. The rectifier circuit 14 is for example but not limited to abridge rectifier circuit (not shown), which converts the phase-cut AC dimming signal with positive and negative portions to a rectified dimming signal VD with only positive portions. The light emitting device driver circuit 26 drives a light emitting device circuit; it receives the rectified dimming signal VD and adjusts the brightness of the light emitting device circuit according to the rectified dimming signal VD. The light emitting device circuit is for example but not limited to the LED circuit 11 as shown in the figure.

The active bleeder circuit 28 includes a detection circuit 281 and a current sinker circuit 282. The detection circuit 281 is coupled to the rectifier circuit 14, and it generates and accumulates a detection signal according to the rectified dimming signal VD. The current sinker circuit 282 is coupled to the detection circuit 281, for receiving the detection signal and generating a latching current to trigger the TRIAC dimmer circuit 12 by operating a switch therein when the detection signal exceeds a predetermined level.

Figure 5A:
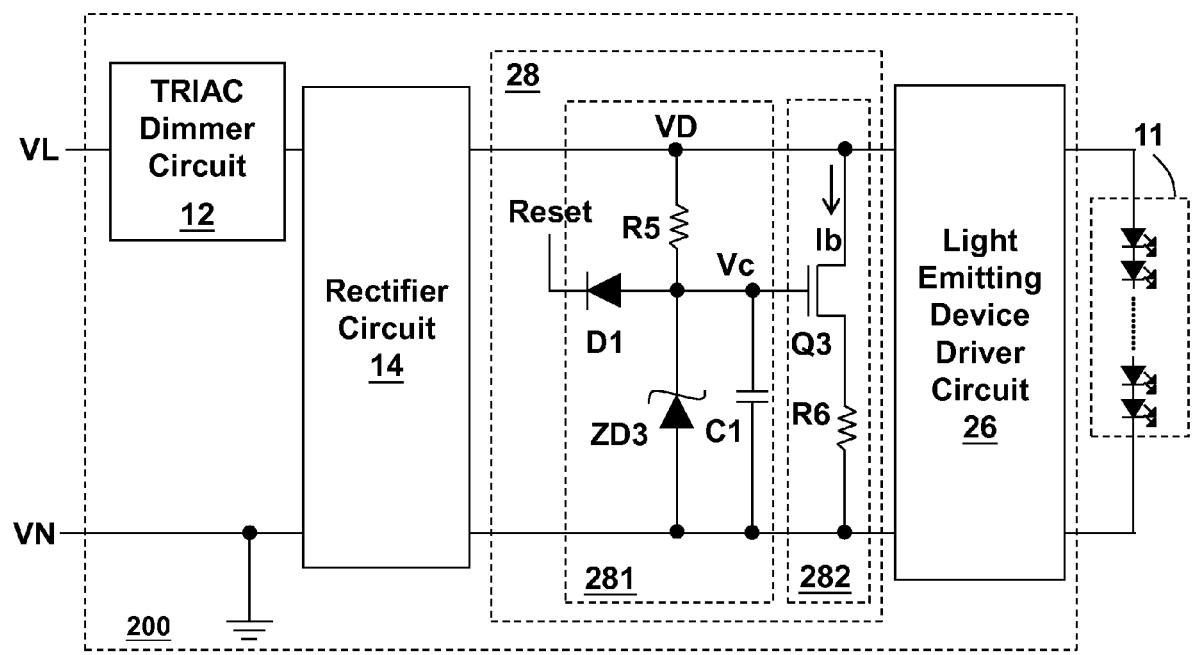
FIGS. 5A-5B show a second embodiment of the present invention.
Figure 5B:
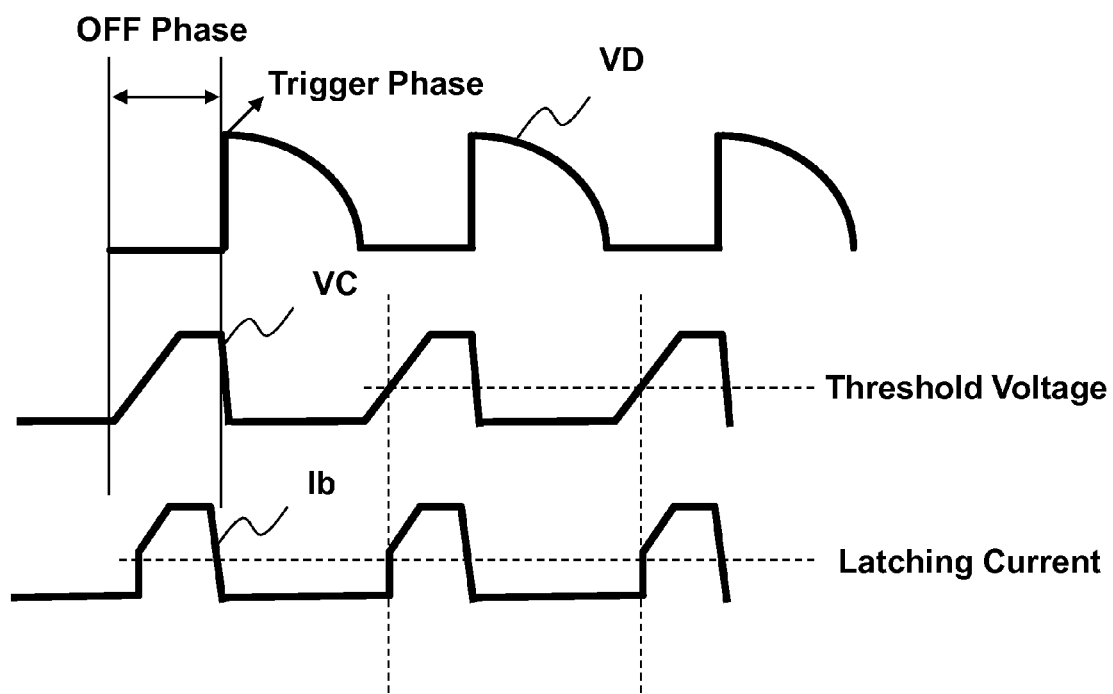

FIGS. 5A-5B show a second embodiment of the present invention, wherein FIG. 5A shows an a more specific embodiment of the active bleeder circuit 28, and FIG. 5B shows the relationship among the rectified dimming signal VD, the detection signal Vc, and the current Ib. As shown in the figures, in the active bleeder circuit 28, the detection circuit 281 includes for example but not limited to an RC circuit, which includes a resistor R5 and a capacitor C1, and a Zener diode ZD3. The resistor R5 has one end coupled to the rectified dimming signal VD generated by the rectifier circuit 14, and the resistor R5 converts the rectified dimming signal VD to the detection signal Vc at the other end of the resistor R5. The capacitor C1 stores the detection signal Vc; as the capacitor C1 is charged, it accumulates the detection signal Vc to generate the waveform as shown by FIG. 5B. The Zener diode ZD3 has a reverse end coupled to the detection signal Vc, and a forward end coupled to a relatively lower level, for example but not limited to a ground level. Therefore, the Zener diode ZD3 is turned ON (reversely) only when the detection signal Vc exceeds a reverse breakdown voltage of the Zener diode ZD3.

Referring to FIGS. 5A-5B, in the OFF phase of the rectified dimming signal VD, there still is a very low current charging the capacitor C1 through the resistor R5. The current sinker circuit 282 includes for example but not limited to a switch Q3 and a resistor R6. When the detection signal Vc at one end of the capacitor C1 is accumulated over a predetermined level, for example but not limited to a threshold voltage of the switch Q3, the switch Q3 turns ON, and generates the current Ib. When the current Ib exceeds a level sufficient for the latching current of the TRIAC device, the TRIAC device is triggered. On the other hand, after the TRIAC is triggered at the trigger phase, because the detection signal Vc exceeds the reverse breakdown voltage of the Zener diode ZD3, the Zener diode ZD3 is turned ON reversely, and the capacitor C1 discharges, such that the detection signal Vc decreases, and the switch Q3 turns OFF.

Figure 1A:
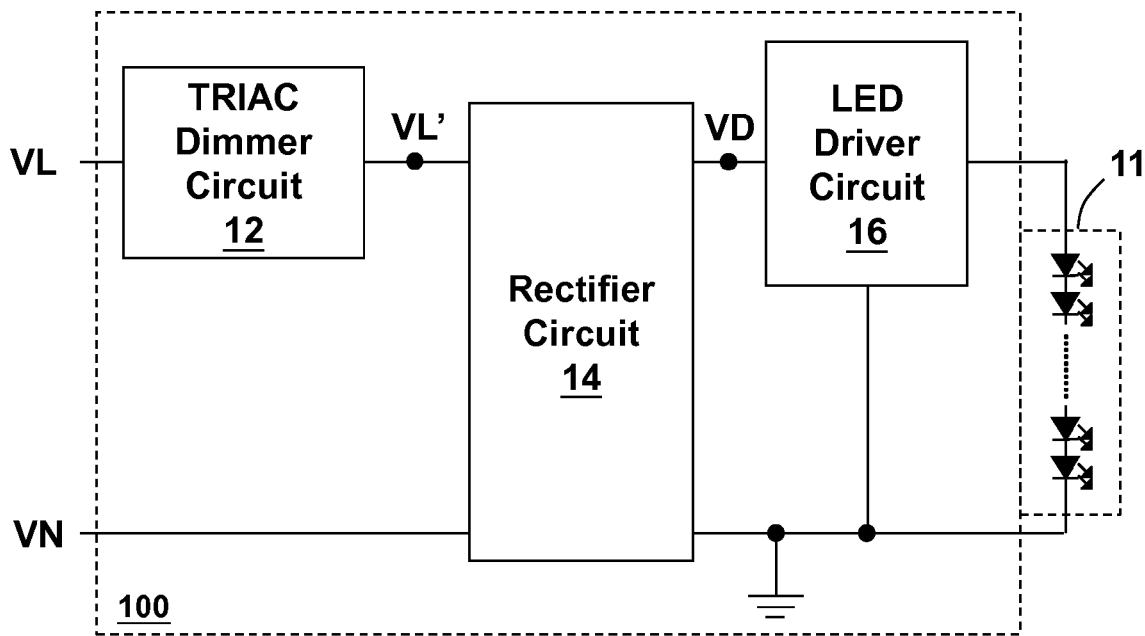
FIG. 1A shows a schematic diagram of a prior art LED power supply circuit 100.
Figure 1B:
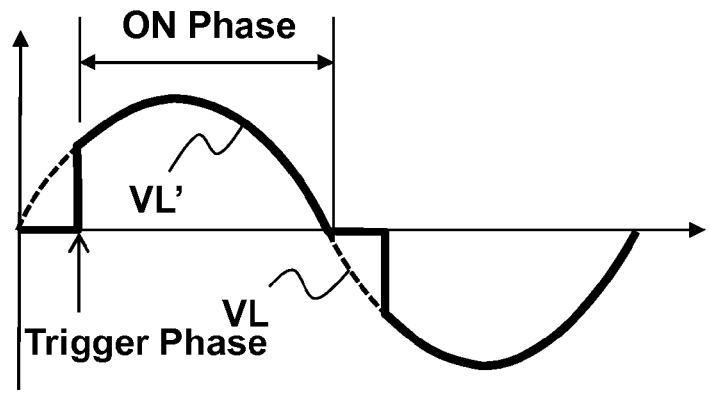
FIGS. 1B and 1C show signal waveforms with sufficient and insufficient latching current for triggering the TRIAC device.
Figure 1C:
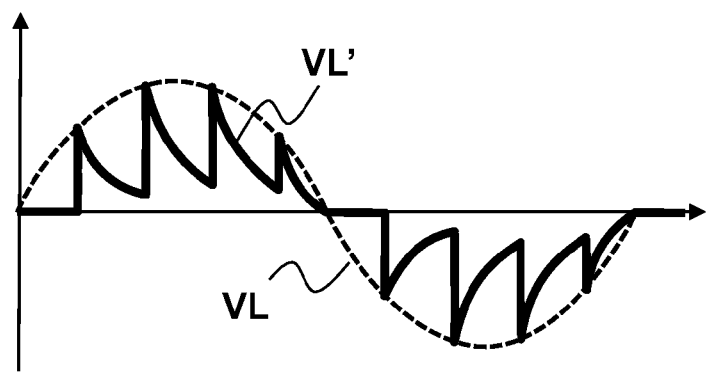
Figure 2A:
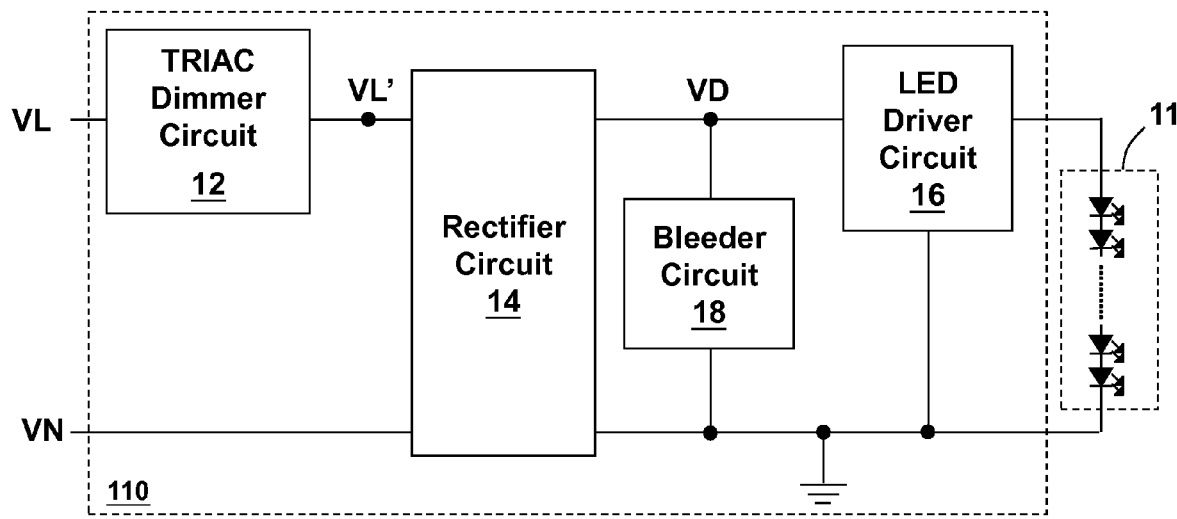
FIGS. 2A and 2B are schematic diagrams of another prior art LED power supply circuit.
Figure 2B:
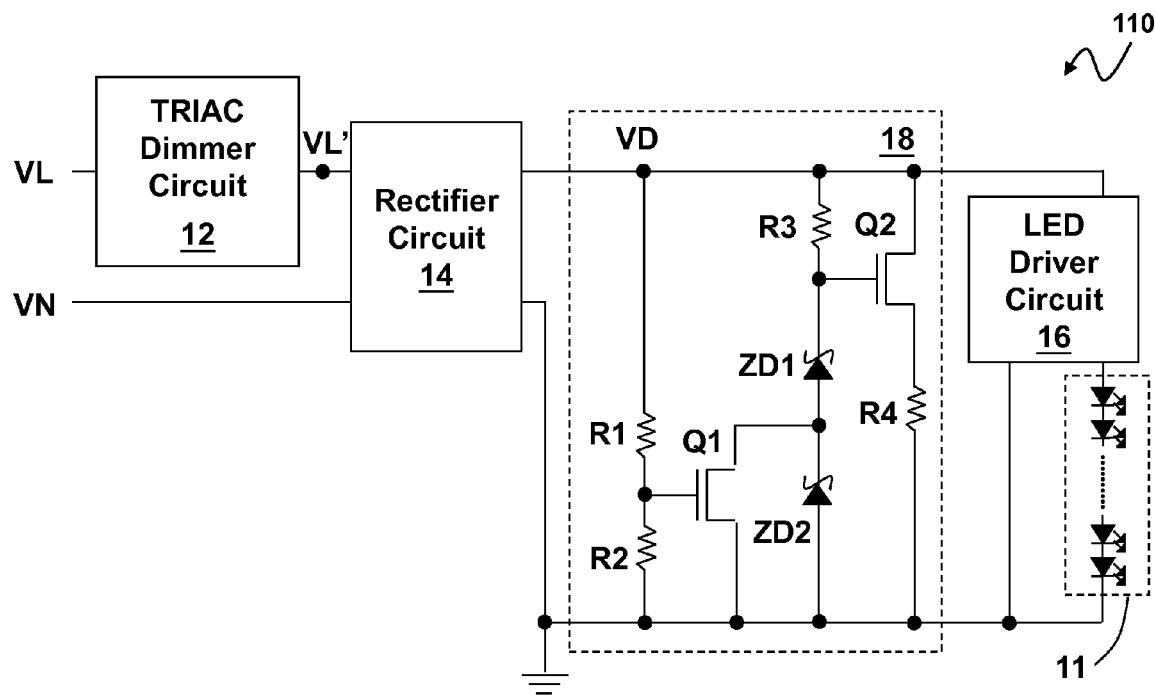
Figure 2C:
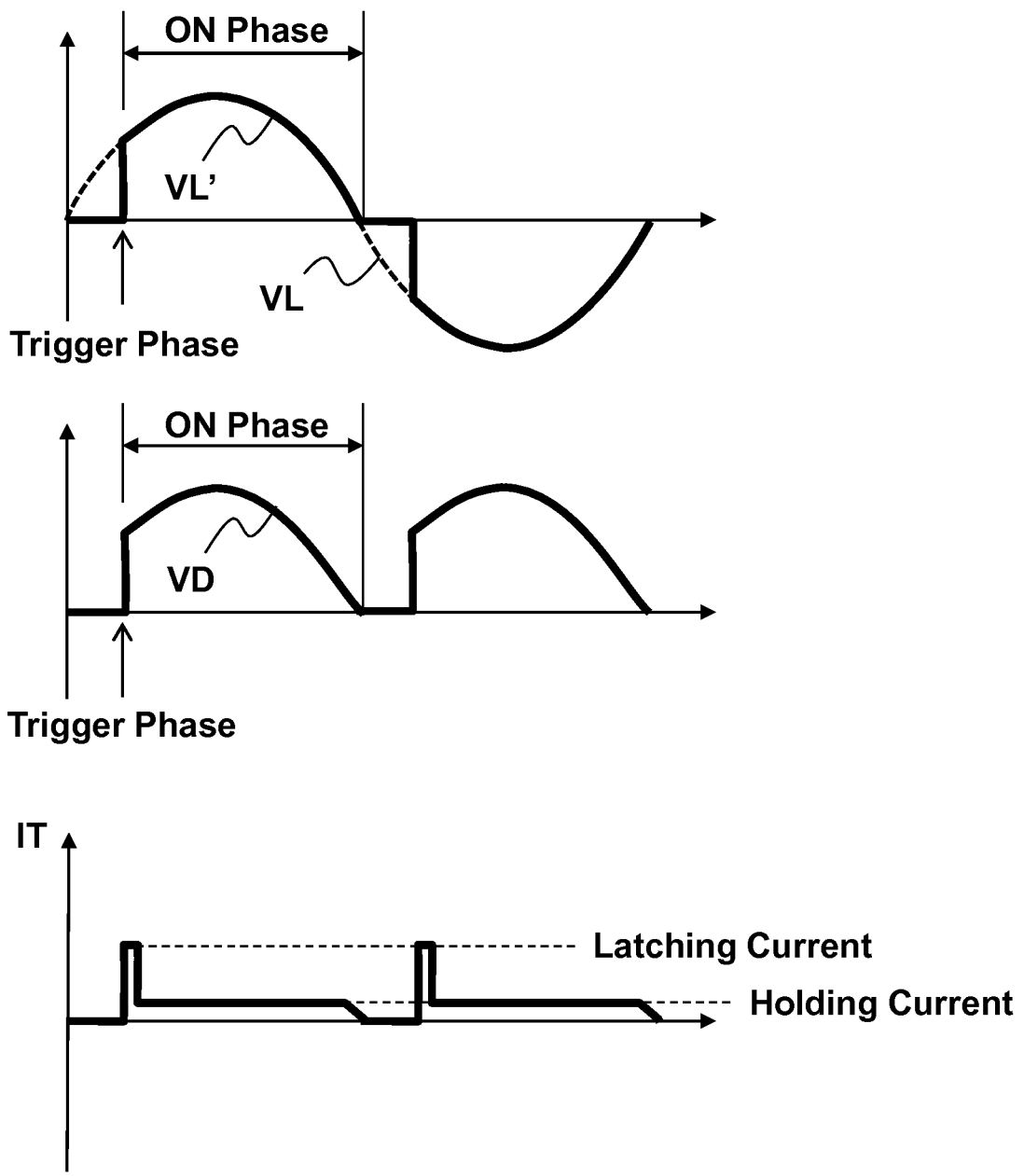
FIG. 2C shows waveforms of the AC input signal VL, the phase-cut AC dimming signal VL', and the TRIAC current IT corresponding to FIGS. 2A and 2B.

Because the present invention stores and accumulates the detection signal by the capacitor C1 of the detection circuit 281 in the OFF phase of the rectified dimming signal (or the OFF state of the TRIAC dimmer circuit 12), the present invention can trigger the TRIAC device successfully even when the trigger phase is very close to the end of the rectified dimming signal where the amplitude of the signal is very low, i.e., the present invention can trigger the TRIAC device in all phase. Furthermore, in an application where the TRIAC dimmer circuit 12 is not provided, or in a case where a user adjusts the dimming signal to be ON for all phase, because the Zener diode ZD3 is kept in a reversely turned ON state, the capacitor C1 can not store sufficient charges to turn ON the switch Q3, i.e., the switch Q3 is kept OFF, and the current sinker circuit 282 will not generate the "bleeding current". Thus, the present invention dose not consume power in these conditions, and is advantageous over the prior art shown in FIGS. 2A and 2B.

Note that, in FIG. 5A, the function of the resistor R5 is to generate a voltage drop and to provide a current path for charging the capacitor C1, such that the rectified dimming signal VD can be converted to the detection signal Vc. The same function may be achieved by other devices or circuits which can generate the voltage drop and provide the current path for charging the capacitor C1, for example but not limited to a transistor, etc. Therefore, the resistor R5 should be considered as only one of the preferable embodiments of a conversion device. The function of the Zener diode ZD3 is to turn OFF the switch Q3 by pulling down the detection signal Vc when the dimming signal has reached the trigger phase. This function can be achieved by other devices and circuits. For example, the Zener diode ZD3 can be replaced by a device or a circuit which compares the rectified dimming signal with a given threshold level, and turns OFF the switch Q3 according to the comparison result. Therefore, the Zener diode ZD3 should be considered as only one of the preferable embodiments of an OFF control circuit to turn OFF the switch Q3. The Zener diode is preferred because it is simple, but the present invention is not limited to the Zener diode. The function of the diode D1 is to reset the detection signal Vc, that is, when the reset signal Reset is zero (or any level sufficiently low), the detection signal Vc will be reset to the voltage across the diode D1, typically 0.7V (or when the reset signal Reset is at another level, the detection signal Vc will be reset to the level of the reset signal Reset plus 0.7V), such that the detection signal Vc is reset to a known level. If the reset function is not required, or the relationship between the reset signal Reset and the detection signal Vc needs to be arranged otherwise, the diode D1 may be omitted or replaced by another device or circuit, such as a switch, different number or different type of diodes, or other devices, etc. Therefore, the diode D1 should be considered as only one of the preferable embodiments of a reset circuit. In one embodiment of the reset circuit, the detection signal Vc may be reset periodically such as every cycle, and the reset signal Reset for example may be synchronous with the AC signal VL.

Figure 6:
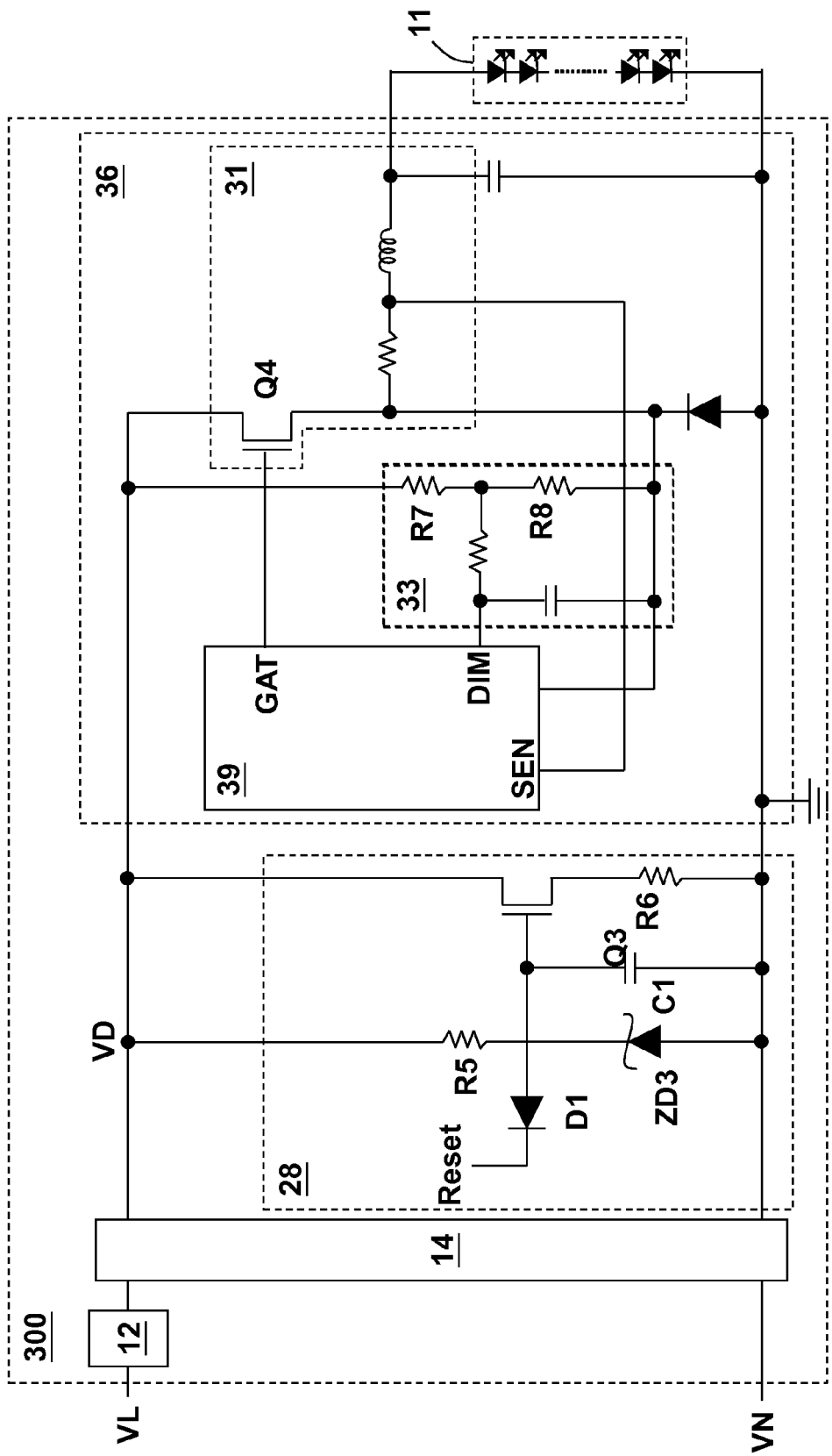
FIG. 6 shows a third embodiment of the present invention.

FIG. 6 shows a third embodiment of the present invention. This embodiment shows an example of a more specific embodiment of a light emitting device driver circuit 36 in a light emitting device power supply circuit 300. As shown in the figure, the light emitting device driver circuit 36 may employ a non-isolated buck power converter structure. Note that the non-isolated buck power converter structure is only one application embodiment of the present invention. The light emitting device driver circuit 36 may employ any other proper structure. As shown in FIG. 6, the light emitting device driver circuit 36 includes a light emitting device control circuit 39 and a power stage circuit 31, and further includes for example but not limited to a voltage detection circuit 33. The voltage detection circuit 33 is coupled to the rectifier circuit 14, for detecting the rectified dimming signal VD generated by the rectifier circuit 14, or a signal related to the rectified dimming signal VD. The voltage detection circuit 33 for example may include a voltage divider circuit, which includes resistors R7 and R8 connected in series, wherein the resistor R7 has one end electrically connected to the rectified dimming signal VD, and a voltage divider end between the resistors R7 and R8 is coupled to a dimming signal node DIM of the light emitting device control circuit 39. When the rectified dimming signal is at zero level, the voltage divider end is also at the zero level, and therefore, the light emitting device control circuit 39 can obtain the timing when the rectified dimming is at zero level, and control the power switch Q4 of the power stage circuit 31 according to the timing. For example, the light emitting device control circuit 39 can generate a switch control signal through a switch signal node GAT to turn ON a power switch Q4 when the rectified dimming signal is at zero level (not necessarily at the exactly timing, but can be a later timing). Hence, at the trigger phase, because the power switch Q4 is already turned ON, the power stage circuit 31 can generate the latching current to trigger the TRIAC dimmer circuit 12 very quickly, and the latching current can be provided to the LED circuit 11 through the power stage circuit 31. This embodiment illustrates that the present invention can be applied to or combined with other structures which require generating the latching current. For the details of the fast trigger circuit, please refer to the patent application U.S. Ser. No. 13/421,733 filed by the same applicant.

Figure 7:
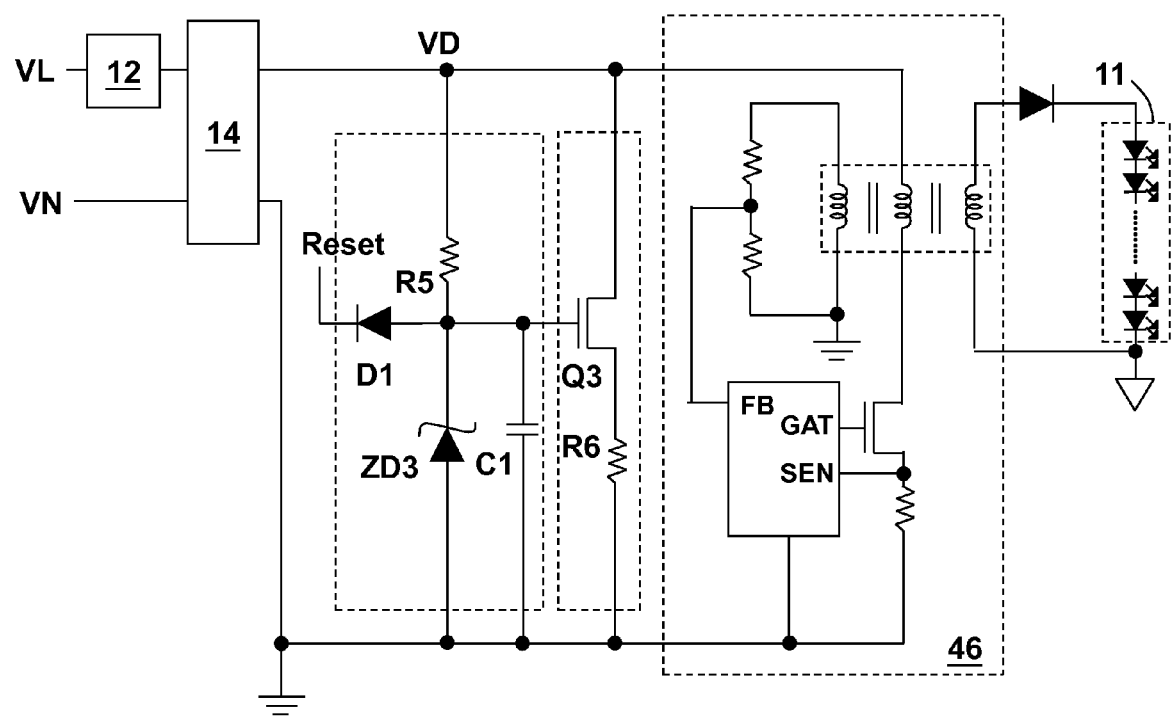
FIG. 7 shows a fourth embodiment of the present invention.

FIG. 7 shows a fourth embodiment of the present invention. This embodiment is different from the third embodiment in that, in this embodiment, the present invention is applied in an isolated power converter structure with a transformer, but not the non-isolated power converter structure shown in FIG. 6. This embodiment illustrates that the present invention can be applied in a light emitting device driver circuit 46 of the isolated power converter structure, not limited to the non-isolated light emitting device driver circuit 36 shown in FIG. 6. Besides, the non-isolated power converter structure shown in FIG. 6 is illustrated as an asynchronous buck structure only for example, and the present invention may also be applied in other types of structures, such as a synchronous buck structure, a synchronous or asynchronous boost structure, a synchronous or asynchronous inverting structure, a synchronous or asynchronous buck-boost structure, etc. These power stage structures are well known by those skilled in the art, so details thereof are omitted here.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the active bleeder circuit of the present invention is not limited to being applied in the light emitting device power supply circuit, but it may be applied in any application which requires using a TRIAC device. For another example, a device which does not substantially influence the primary function of a signal can be inserted between any two devices in the shown embodiments, such as a switch or the like. For another example, the light emitting device is not limited to the LEDs in the aforementioned embodiments, but it may be other types of the light emitting device. In view of the foregoing, the spirit of the present invention should cover all such and other modifications and variations, which should be interpreted to fall within the scope of the following claims and their equivalents.

What is claimed is:

1. A light emitting device power supply circuit, comprising:
    a tri-electrode AC switch (TRIAC) dimmer circuit, for generating a phase-cut AC dimming signal, wherein the phase-cut AC dimming signal has an OFF phase and an ON phase;
    a rectifier circuit, which is coupled to the TRIAC dimmer circuit, for generating a rectified dimming signal according to the phase-cut AC dimming signal, wherein the rectified dimming signal has an OFF phase and an ON phase corresponding to the OFF phase and the ON phase of the phase-cut AC dimming signal;
    a light emitting device driver circuit, for driving a light emitting circuit according to the rectified dimming signal; and
    an active bleeder circuit, including:
        a detection circuit, which is coupled to the rectifier circuit, for generating a detection signal and accumulating the detection signal in the OFF phase; and
        a current sinker circuit, which is coupled to the detection circuit, for generating a latching current to trigger the TRIAC dimmer circuit by operating a switch therein when the detection signal exceeds a predetermined level;
        wherein the detection circuit includes:
            a conversion device, for converting the rectified dimming signal to the detection signal;
            a storage device, for storing and accumulating the detection signal; and
            an OFF control circuit, for turning OFF the switch of the current sinker circuit in the ON phase,
            wherein the OFF control circuit includes a Zener diode, which has a reverse end coupled to the detection signal, and a forward end coupled to a relatively lower level, such that when a voltage difference between the detection signal and the relatively lower level exceeds a reverse breakdown voltage of the Zener diode, the Zener diode turns ON reversely.

2. The light emitting device power supply circuit of claim 1, wherein the current sinker circuit turns OFF the switch therein to stop generating the latching current in the ON phase.

3. A light emitting device power supply circuit, comprising:
    a tri-electrode AC switch (TRIAC) dimmer circuit, for generating a phase-cut AC dimming signal wherein the phase-cut AC dimming signal has an OFF phase and an ON phase;
    a rectifier circuit, which is coupled to the TRIAC dimmer circuit, for generating a rectified dimming signal according to the phase-cut AC dimming signal, wherein the rectified dimming signal has an OFF phase and an ON phase corresponding to the OFF phase and the ON phase of the phase-cut AC dimming signal;
    light emitting device driver circuit, for driving a light emitting circuit according to the rectified dimming signal; and
    an active bleeder circuit, including:
        a detection circuit, which is coupled to the rectifier circuit, for generating a detection signal and accumulating the detection signal in the OFF phase; and
        a current sinker circuit, which is coupled to the detection circuit, for generating a latching current to trigger the TRIAC dimmer circuit by operating a switch therein when the detection signal exceeds a predetermined level;
        wherein the detection circuit includes;
            a conversion device, for converting the rectified dimming signal to the detection signal;
            a storage device, for storing and accumulating the detection signal; and
            a reset circuit, for resetting the detection signal.

4. The light emitting device power supply circuit of claim 3, wherein the reset circuit includes a diode, which has a forward end coupled to the storage device, and a reverse end for receiving a reset signal to reset the detection signal.

5. An active bleeder circuit, comprising:
    a detection circuit, coupled to a rectified signal having an OFF phase and an ON phase, for generating a detection signal according to the rectified signal and accumulating the detection signal in the OFF phase of the rectified signal; and
    a current sinker circuit, which is coupled to the detection circuit, for generating a latching current by operating a switch therein when the accumulated detection signal exceeds a predetermined level;
    wherein the detection circuit includes:
    a conversion device, for converting the rectified signal to the detection signal;
    a storage device, for storing and accumulating the detection signal; and
    an OFF control circuit, for turning OFF the switch of the current sinker circuit in the ON phase,
    wherein the OFF control circuit includes a Zener diode, which has a reverse end coupled to the detection signal, and a forward end coupled to a relatively lower level, such that when a voltage difference between the detection signal and the relatively lower level exceeds a reverse breakdown voltage of the Zener diode, the Zener diode turns ON reversely.

6. The active bleeder circuit of claim 5, wherein the current sinker circuit turns OFF the switch therein to stop generating the latching current in the ON phase.

7. An active bleeder circuit, comprising:
a detection circuit, coupled to a rectified signal having an OFF phase and an ON phase, for generating a detection signal according to the rectified signal and accumulating the detection signal in the OFF phase of the rectified signal; and
a current sinker circuit, which is coupled to the detection circuit, for generating latching current by operating a switch therein when the accumulated detection signal exceeds a predetermined level;
wherein the detection circuit includes:
a conversion device, for converting the rectified signal to the detection signal;
a storage device, for storing and accumulating the detection signal; and
a reset circuit, for resetting the detection signal.

8. The active bleeder circuit of claim 7, wherein the reset circuit includes a diode, which has a forward end coupled to the storage device, and a reverse end for receiving a reset signal to reset the detection signal.

9. A TRIAC (tri-electrode AC switch) control method, comprising:
receiving a rectified signal having an OFF phase and an ON phase, wherein the rectified signal is generated by rectifying a phase-cut AC signal generated by a TRIAC circuit;
generating a detection signal according to the rectified signal and accumulating the detection signal in the OFF phase; and
when the accumulated detection signal exceeds a predetermined level, generating a latching current to trigger the TRIAC circuit;
wherein the step of generating and accumulating the detection signal further includes: resetting the detection signal periodically.

10. The TRIAC control method of claim 9 further comprising: stopping generating the latching current in the ON phase.

11. The TRIAC control method of claim 9, wherein the step of generating and accumulating the detection signal includes: charging a capacitor by a current according to the rectified signal in the OFF phase.

12. The TRIAC control method of claim 11 further comprising: discharging the capacitor in the ON phase.

\* \* \* \* \*